Jan. 28, 1941.  W. J. SEELINGER  2,229,820
SAFETY LATCH DEVICE
Filed March 29, 1939

INVENTOR.
WILLIAM J. SEELINGER
BY
John H. Leonard
his ATTORNEY.

Patented Jan. 28, 1941

2,229,820

UNITED STATES PATENT OFFICE 2,229,820

SAFETY LATCH DEVICE

William J. Seelinger, Detroit, Mich.

Application March 29, 1939, Serial No. 264,800

5 Claims. (Cl. 292—182)

This invention relates to a safety latch for automobile doors and the like, and particularly to a latch and automobile body combination for automatically latching one of the doors in closed position consequent upon closing of an adjacent door.

For the purposes of illustration, the invention will be described in connection with an automobile body of the "four-door" type, its use in connection with other structures being readily apparent therefrom.

In the four-door automobile bodies, the common practice is to provide a front door which is hinged at its forward margin and a rear door which is hinged at its rear margin, the doors swinging inwardly toward a side body post located therebetween, and the post forming a door jamb for the doors. Both doors usually are provided with manually operated latches for securing them in closed position, these latches being operable both by inside and outside handles on the doors. This type of latch is a serious danger in the case of children riding in the rear compartment of the car as they often lean on the inner handle of the rear door latch and thereby cause the latch to release. As a result thereof, the rear door may swing open unexpectedly and allow them to fall from the moving car.

One of the principal objects of the present invention is to provide a body, door and safety latch combination by which the rear door is secured in closed position and cannot be opened even though the usual manual latch is released, thereby affording safety for children and others riding in the rear compartment.

Another object is to provide a simple and effective latching combination for this purpose which may be installed readily in the usual hollow sheet metal body post of the vehicle and all parts of which are substantially concealed when the doors are in closed position.

Another specific object is to provide a movable latch element located entirely within the body post, and which is operated by a cooperating member on the front door to effect latching engagement with a cooperating member on the rear door when the doors are in closed position, and in which the movable latch element may be moved into latching position by the front door either before or after the rear door is closed.

Other objects and advantages will become apparent from the following specification, wherein reference is made to the drawing, in which.

Figure 1:
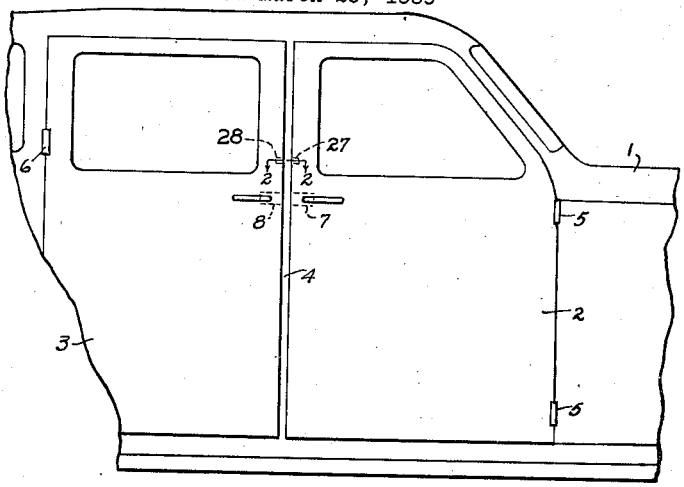
Fig. 1 is a fragmentary side elevation of an automobile body with the device of the present invention installed.

Referring to the drawing, there is illustrated in Fig. 1 an automobile body 1 having a front door 2 and a rear door 3 with an upright side body post 4 therebetween, the lateral faces of the body post 4 providing jambs for the doors. The front door is hinged to the body at its forward margin by hinges 5, and the rear door is hinged to the body at its rear margin by hinges 6. The doors are provided with the usual hand operated latches, indicated at 7 and 8, respectively, which are operable by the usual inside and outside handles.

In the present day automobile bodies, the post 4 is usually in the form of a sheet metal channel which is open toward the inside of the body, as indicated at 9, and the outer wall 10 of which is exposed slightly between the adjacent edges of the doors when the doors are closed. The doors are substantially the same in structure and the door 2 only is referred to herein for illustrating the construction in detail.

Figure 2:
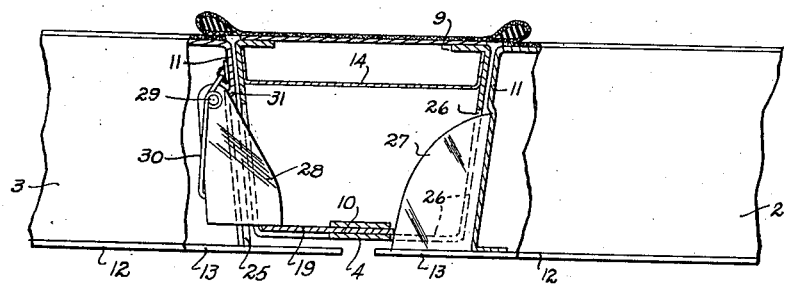
Fig. 2 is an enlarged horizontal sectional view taken on the plane indicated by the line 2—2 in Fig. 1.
Figure 3:
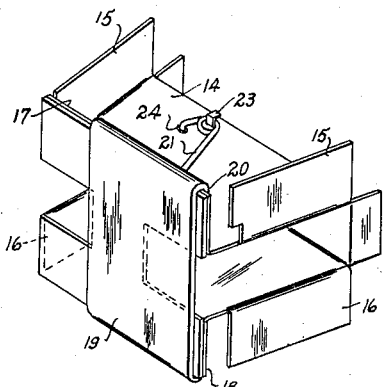
Fig. 3 is a perspective view of part of the latch device including the movable latch element and supporting frame.
Figure 5:
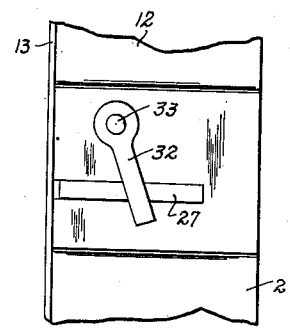
Fig. 5 is a fragmentary end elevation of the rear door showing the selectively operable latch member for cooperation with the latching device.
Figure 4:
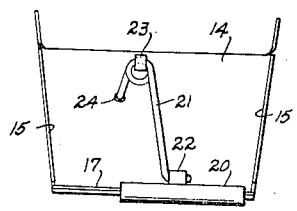
Fig. 4 is a top plan view of the device illustrated in Fig. 3.

As illustrated in Fig. 2, the door comprises generally a frame member 11 and a sheet metal panel 12 secured thereto and forming the outer face of the door, the panel 12 extending rearwardly, as indicated at 13, beyond the frame member 11 so as to partially overlie the outer exposed face or wall 10 of the post 4.

In addition to the usual latches 7 and 8, the safety latch device of the present invention is installed within the post 4. In the form shown for purposes of illustration, the safety latch may comprise a rigid sheet metal frame 14 which is generally channel-shaped and has upturned flanges 15 and downturned flanges 16 at its lateral margins. The frame 14 is open outwardly of the body on which the frame is adapted to be mounted and at its outward margins has upper and lower flanges 17 and 18. The lateral limits of the frame are divergent inwardly of the body, the same as the lateral (forward and rearward) walls of the upright post 4, so that the frame may be positioned within the post and secured thereto, with its flanges 17 and 18 positioned in closely spaced relation to the outer wall 10 of the post 4. Such connection preferably is accomplished by spot welding the flanges 15 and 16 to the inner face of the lateral walls of the post 4.

The forward flanges 17 and 18 provide a guideway on which is slidably mounted a movable keeper 19. In the form of the invention illustrated, the keeper 19 may comprise a flat strip of sheet metal having flanges, such as indicated at 20, which are spaced inwardly from the inner face of the strip for receiving the flanges 17 and 18, respectively, between the inner face of the strip and the flanges 20. This affords a slideway for the keeper 19 and guides it accurately during operation. The keeper 19 is urged toward the front door, or out of latching position with respect to the rear door, by means of a spring 21. The spring may be anchored conveniently in place by connecting one of its ends to a suitable tongue 22 on the flange 20, a portion between its ends to a tongue 23 on the frame 14, and the opposite end through a suitable aperture 24 in the frame 14.

The latch device described may be installed in the post 4 at any location desired, suitable openings, such as indicated at 25 and 26, being provided in the rear and front side walls, respectively, of the post 4 in alignment with the opening of the frame 14.

Mounted on the front door is a latch dog 27 having a cam surface and which is arranged to enter the opening 26 when the front door is closed and to engage and move the keeper 19 against the force of the spring 21 and toward the rear door. A latch dog 28 is carried by the rear door and is positioned to enter the opening 25 of the post and to move into the frame 14. The keeper 19 is moved to a position by the latch dog 27 of the front door, when the front door is closed, so as to obstruct the movement of the latch dog 28 out of the passage 25. However, since the front door may be closed while the rear door is open, and the rear door subsequently slammed, it is necessary to provide against damage to the latch dog 28 as a result of such circumstances. Consequently, the latch dog 28 is pivotally secured in the rear door 3 by means of a pivot 29 and is normally urged outwardly by means of a spring 30 so as to properly cooperate with the keeper 19. A stop 31 is provided on the latch dog 28 to limit its outward movement.

Again, there may be occasions when it is desired to render the present latch device inoperative temporarily, and for this purpose the latch dog 28 may be held in retracted position. This is accomplished by means of a movable abutment 32 which is pivoted to the door, as indicated at 33, and which may be swung into a position overlying the latch dog 28 when the latch dog 28 is retracted.

As above described, the latch device and door combination herein disclosed may take various forms and preferably is in addition to the already existing latches. Usually, however, on automobile body doors, a key-operated lock for each latch is provided for at least one front door and the adjacent rear door. With the present invention, the lock on the rear door latch is unnecessary because when both doors are closed, and the front door latch is locked, the present safety latch device effectively locks the rear door.

Having thus described my invention, I claim:

1. In an automobile body including a front door, a rear door and a body post therebetween having a cavity and openings thereinto, a latch device comprising a frame adapted to fit within the said cavity of the body post and adjacent the openings, a latch keeper movably mounted in the frame and guided thereby and lying wholly within the said body post, a cooperating retractable and extensible latch dog mounted in the said rear door and adapted to enter an adjacent one of the openings of the said post when the said rear door is closed while the dog is in extended position, a spring yieldably urging the said movable latch dog into extended position, a rigid latch dog carried by the said front door and operatively engageable with the said latch keeper through another one of said openings in the post when the front door is closed for moving said latch keeper into position behind the latch dog of the rear door for latching the said rear door in closed position, when the retractable latch dog has moved through said adjacent opening, means normally urging the keeper out of latching position with respect to the retractable latch dog whereby the keeper is inoperative to latch the rear door when the front door is open, means on said retractable latch dog for retracting the retractable latch dog upon engagement of the retractable latch dog with the keeper as the rear door is closed while the front door is in closed position, and said retractable latch dog moving to extended position after it has passed beyond the keeper in the closing direction of the rear door.

2. In an automobile body including a front door, a rear door and a body post therebetween having a cavity and openings thereinto, each of said openings having a portion lying in the outwardly facing wall of the post and each opening extending into one of the adjacent side walls of the post, a latch device comprising a frame adapted to fit within said cavity of the body post and having openings registering with those of the post respectively, said frame having a wall facing outwardly of the post and extending generally forwardly and rearwardly of the body, guideways on said last mentioned wall, a latch keeper slidably mounted on said guideways and guided thereby and overlying said last mentioned wall near the upper and lower ends of the keeper, the vertical mid-portion of the keeper being position to overlie the openings in the last mentioned wall in different positions of the keeper, a latch dog mounted on the rear door and adapted to enter adjacent registering openings of the post and frame when the rear door is closed, a latch dog carried by the front door and operatively engageable with said keeper through the other opening in the post when the front door is closed to move the latch keeper into position in which it overlies the said adjacent registering opening of the frame and thereby prevents movement of the latch dog of the rear door out of said post and frame whereby the rear door is latched in position, and said keeper is buttressed by the outer walls of said frame.

3. In an automobile body front door and rear door and intermediate fixed hollow door post arrangement lying between vertical planes common planes common to the adjacent portions of said doors, which post has front and rear walls and an intermediate outwardly disposed wall, said arrangement further including a yieldable latch dog on the rear door which is movable through an opening in the rear wall of the post to latch the rear door in closed position, and wherein the post and front door have mounted thereon respectively a movable keeper for said latch dog and means operable through an opening in said front wall as the front door is closed to move the keeper into positive blocking relation to the latch dog; wherein the keeper lies wholly within the cavity formed by said walls of the post at all times.

4. In an automobile body front and rear door and intermediate fixed hollow door post arrangement, lying vertical planes common to the adjacent portions of said doors, which post has front and rear walls and an intermediate outwardly disposed wall, said arrangement further including a yieldable latch dog on the rear door which is movable through an opening in the rear wall of the post to latch the rear door in closed position, and wherein the post and front door have mounted thereon respectively a movable keeper for said latch dog, and means operable through an opening in said front wall as the front door is closed to move the keeper into positive blocking relation to the latch dog; wherein the mounting for the keeper comprises a frame with a keeper-carrying portion positioned inside the post closely adjacent said intermediate wall of the post, and the keeper, when in latch dog blocking position, is disposed in face to face contact with the inner surface of said outwardly disposed wall of the post whereby said outwardly disposed wall of the post reinforces the keeper against being distorted by attempts to open the rear door while latched.

5. In an automobile body including a front door, a rear door and a body post therebetween having a cavity therein and openings thereinto, said post and the adjacent portions of the respective doors lying in common vertical planes, a latch device comprising a frame adapted to fit within the said cavity of the body post and adjacent the openings, a latch keeper movably mounted on the frame and lying wholly within the said body post in all positions of the keeper, a cooperating latch dog mounted on the said rear door for movement outwardly and inwardly of the door in said plane and adapted to enter an adjacent one of the openings of the said post when the said rear door is closed, a spring yieldably urging the keeper into a position in which it does not interfere with the entry of the said dog into said adjacent opening, a latch dog carried by the said front door and operatively engageable with the said movable latch keeper through another one of said openings in the post when the front door is closed and operating to move said latch keeper into position to block the movement of the latch dog of the rear door out of said adjacent opening for latching the said rear door in closed position, said keeper and latch dog having relatively abutting portions acting positively to prevent outward movement of the rear door in the latch dog blocking position of the keeper.

WILLIAM J. SEELINGER.

CERTIFICATE OF CORRECTION.

Patent No. 2,229,820.  January 28, 1941.

WILLIAM J. SEELINGER.

It is hereby certified that error appears in the printed specification of the above numbered patent requiring correction as follows: Page 2, second column, line 49-50, claim 2, for the word "position" read --positioned--; line 65, claim 3, strike out "door"; line 68, same claim, strike out the words "planes common"; page 3, first column, line 9-10, claim 4, for "arrangement, lying" read --arrangement lying between--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.